Oct. 21, 1924.
G. WASHINGTON
1,512,730
AMORPHOUS SACCHARINE POWDER AND PROCESS OF MAKING SAME
Original Filed June 7, 1918    2 Sheets-Sheet 2
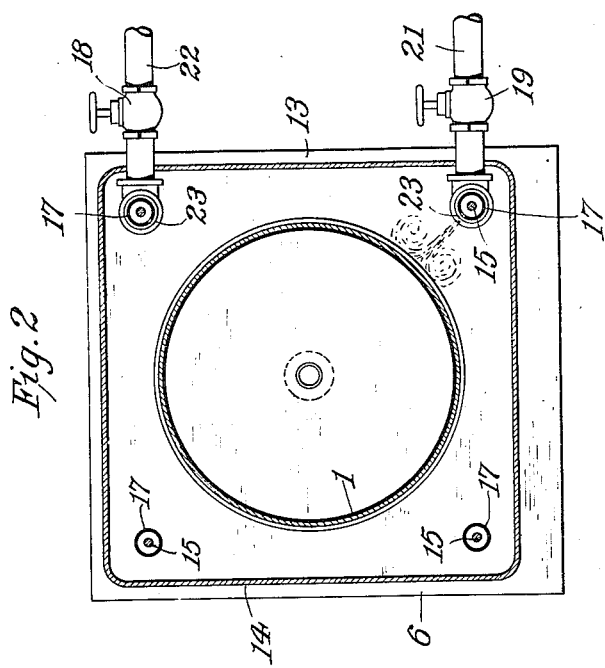
Inventor
George Washington
By his Attorney Patented Oct. 21, 1924.

1,512,730

UNITED STATES PATENT OFFICE.

GEORGE WASHINGTON, OF BROOKLYN, NEW YORK.

AMORPHOUS SACCHARINE POWDER AND PROCESS OF MAKING SAME.

Original application filed June 7, 1918, Serial No. 238,629. Divided and this application filed March 7, 1921. Serial No. 450,302.

*To all whom it may concern:*

Be it known that I, GEORGE WASHINGTON, a citizen of the United States of America, residing at Brooklyn, city of New York, county of Kings, and State of New York, have invented certain new and useful Improvements in Amorphous Saccharine Powders and Processes of Making Same, of which the following is a specification.

My invention relates generally to a new form of saccharine matter and more specifically comprises certain improved compounds therewith containing and preserving flavoring or stimulating constituents. It forms a division of my prior application Serial No. 238,629, filed June 7, 1918.

The foundation of my invention primarily resides in my discovery of the fact that, when a perfect solution of a saccharine substance such as cane sugar is carefully evaporated under reduced pressure to dryness, and under conditions inhibitive of crystallization or granulation, the dried residue will consist of a homogeneous glass-like modification of sugar of peculiar physical structure, possessing qualities and properties not found in any of the different crystalline, granular, powdery or syrupy forms in which such substances now appear in the arts.

Secondarily my invention involves the further discovery that such residue is eminently adapted to serve as a solid vehicle or matrix for the retention and preservation of many otherwise perishable, stimulating, or aromatic flavoring substances, from which the latter can be instantly released by simple solution.

My invention therefore enables me to obtain in a new and improved form old and known products, such as for instance, molasses, glucose, maple sugar, etc. and also by incorporating in syrups of various kinds of sugar various stimulants, or aromatic flavoring substances, such as essential oils of lemon, orange, essence of vanilla, soluble vegetable matter, extracts of tea leaves, roasted coffee beans, roasted coffee substitutes, medicinal plants, various fruit juices, such as lemons, oranges, grapes, pineapples, raspberries, etc. enables me to obtain a series of new and useful, dry, soluble preparations from which one can instantly prepare, by simple solution, stimulating or refreshing beverages already sweetened, such as tea, coffee, lemonade, orangeade, etc.

As an illustration of the manner in which my invention is carried into effect: I will now describe the procedure of manipulating a simple saccharine substance such as, for instance, cane sugar, and modifying the same into my new and improved form. To this end an amount of cane sugar is perfectly dissolved, preferably by stirring and without application of heat, in the least possible quantity of water so as to make a nearly but not quite saturated solution (more water might of course be used but this would merely and unduly prolong the work of evaporation, without in the least affecting the final result). The syrup so prepared is next poured into a vacuum dish or pan which is perfectly clean and free from any sugar dust or sugar crystals, if pure cane sugar or other crystallizable form of saccharine matter is used alone, as otherwise the residue will crystallize or granulate by an automatic propagation of crystallization and the modified amorphous form of sugar will not result.

The pressure in the vacuum pan is next reduced to about one inch of mercury by a convenient vacuum pump which is arranged to draw the air, and eventually the vapors, from the pan through a cooled condenser. The pan is then heated, preferably by hot water or steam of the required temperature, to a carefully regulated degree so as to keep the syrup from boiling too violently and perhaps foaming over into the condenser. As is well known, the heat applied to such a mass of syrup cannot raise its temperature to any appreciable amount above any given boiling point as long as there is enough moisture in it for it to emit bubbles of steam. So long as ebullition continues the temperature of the boiling mass will remain constant, as, in a mass concentrated to any given degree it is in reality regulated by, and depends on, the degree of absolute pressure maintained over the boiling syrup in the pan. Thus, for a pressure corresponding to one inch of mercury the boiling temperature is about 77° F. As the mass keeps on boiling and the water keeps on evaporating the syrup will thicken and become less and less plastic while the emission of steam bubbles will become less and less frequent and more difficult. Finally bubbles will only form as a result of a slight local superheating of the mass, which at the superheated point will somewhat soften so that the issuing steam will swell out a bubble that eventually will no longer burst or break. On the contrary, owing to the cooling effect of evaporation and expansion, the walls of this bubble will at once harden and become self-sustaining. Meanwhile other spots in the mass will also locally super-heat, soften, puff up, cool off and harden, and so on until the whole residue has become a foamlike mass of bubbles, which, though at first soft or slightly plastic owing to the retention of some residual moisture, will soon become hard and finally brittle through continued drying and final cooling. When this result is reached the process will be terminated and the vacuum may be broken.

The result of the operation just described will be a foamlike mass of desiccated bubble walls consisting of a homogeneous modification of cane sugar similar to the sugary mass which is obtained by suddenly cooling molten or fused cane sugar and which is commonly known as "barley sugar." It is here to be noted that although I believe that both of the homogeneous sugars just mentioned are similar if not identical in their chemical compositions, their physical forms are vastly different, as one consists of exceedingly fine pellicular walls which may be broken, lightly crushed and sifted into a loose, light, curvy lamular, snow-white powder, which has not been affected in any way by caramelization or other results of heat, whereas the other consists of a dense, glassy, amber colored mass, at least partially caramelized and otherwise affected by the high temperature necessary in its production. Moreover, the essential thing for the production of the one is moisture and boiling at low temperature, while for the other, it is freedom from moisture and fusion at relatively very high temperature.

It will therefore be realized at once that if one is adapted to receive and hold as in a matrix, delicate flavors and aromatic substances easily destroyed by heat, the other is utterly useless for the same purpose; furthermore that, while the loose, fluffy pellicular powder obtained from the one is eminently adapted to instant solution in water without tendency to cake or pack in doing so, the powder obtained by pulverizing the other will of necessity be dense and compact and correspondingly hard to dissolve, and liable to packing or caking in the dissolving process.

The reasons why this pellicular powder has such great dissolving velocity are that the thin, curved sections of the bubble walls comprising it are practically anhydrous and have large surfaces in proportion to their masses so that they greedily drink up water, and also that, as a result of their shapes, there is always a large percentage of voids in a given mass of them, through which voids the solvent fluid may pass easily and rapidly to immediate contact with the extensive surfaces of the particles.

A further advantage of my process is that it permits the production of homogeneous mixtures of various sugars which could not otherwise be obtained, such, for instance as a mixture of sucrose and fructose. Evidently this would be impossible to accomplish by heat, as the one fuses at 180° C. and the other at 90° C., and the fructose would caramelize before the fusing temperature of the sucrose could be attained.

As an illustration of this fact I may point out that by my process maple juice can be obtained as dry, snow-white preparations, perfectly free from caramelization or the results of heat, while, as is well known, whole maple sugar as obtained under present methods of production is a brown, partially caramelized product.

It is apparent also that, in the case of pure glucose, or of any other form of sugar or saccharine substance or compound which similarly occurs commercially in a solid, sticky, somewhat slowly soluble mass which is inconvenient to handle the transformation thereof into the dry, quickly soluble, flaky powder by my invention constitutes an important practical step in advance in the art.

For the purpose of elucidation it may be well to further state that while preparing modified sugar as above described, though it is desirable, it is not essential, for the purpose of obtaining the foam-like residue, to carry on evaporation and desiccation under as high a vacuum and at as low a temperature as above stated. On the contrary it is only essential that the temperature shall not rise during desiccation to a point where the product under preparation would suffer deterioration, or at which the dried mass might sufficiently soften and fuse so as to destroy the self supporting quality necessary to the structure of the residue.

I have found that during the desiccation of a sugary mass as above described, formation and desiccation of bubbles proceeds from the heated surface gradually towards the upper free surface of the mass, and as it is evident that after a layer of bubbles has been built up between the heating surface and the rest of the mass to be desiccated, it will act as a very efficient insulator, the further transmission of heat to the remaining mass will thereafter go on very gradually. Consequently, if the mass being treated is of any considerable thickness the time necessary for complete desiccation will be greatly extended. For this reason I have found it essential in efficient practice to resort for desiccating purposes to a class of apparatus of relatively large heating surface, adapted to handle thin layers of mass for desiccation.

In practice I have also found it preferable to cool the foamy residue before taking it off from the drying surface, as this renders it generally hard and brittle and much easier of removal.

I have further found that when the mass treated as above described consists of purely saccharine substances the general size of the bubbles and the thickness of the bubble walls depends on the thickness of the layer applied to the heating surface and that the bubbles are smaller and their walls thinner in proportion as the layer to be dried is thinner.

I have also found that the formation of bubbles is not affected by the addition or incorporation with the syrup of a solution of certain soluble extracts such as extract of tea leaves, roasted coffe beans, etc., nor seemingly is the bubble formation of a saccharine residue affected by the presence therein of fat globules such as butter fat or cocoa butter, in small amounts.

I have further discovered that saccharine solutions, and especially concentrated syrups, containing volatile aromatic principles such as vanilla, lemon oil, essence of raspberries, etc., may be concentrated and desiccated into said foamlike residue without practically any loss of such volatile aromatic principles. The reason for this is that most of such volatile aromatic principles consist of essential oils and these form oleo-saccharine compounds whose vapor pressures at low temperature are nil or very much reduced, especially in concentrated solutions, and consequently stand desiccation without deterioration or loss of said volatile principles by evaporation. However, if the form of saccharine matter employed is one that easily crystallizes, such as cane sugar, and if from lack of proper care the mass crystallizes or granulates during desiccation, then the oleo-saccharine compound will break up in sugar crystals or grains and the essential oils or aromatic principles will evaporate and disappear.

When a saccharine solution or syrup in combination with aromatic principles, and for that matter with perishable matter such as milk solids, is desiccated into such foamlike mass, the homogeneous sugar has a decided preservative action upon said perishable matter, inasmuch as it serves the purpose of a solid vehicle and acts as a matrix in which are hermetically sealed the particles that would lie open to the deteriorating influences of the atmosphere.

I have further discovered that in order to obtain a homogeneous sugar or homogeneous sugary preparation from a crystallizable sugar such as cane sugar, it is absolutely essential that all the sugar be brought in a perfect state of solution before concentration and desiccation are proceeded with, because crystallization or granulation, whenever possible, will always be produced in preference to the homogeneous sugar modification, and a single seed crystal is sufficient to start the action, which is exothermic or heat giving, whereas homogeneous desiccation is endothermic or heat absorbing. In connection with this I have found that certain non-crystallizable saccharine matters, such as glucose, have an inhibitive effect upon the crystallizing propensities of crystallizable saccharine matter so that it is often advisable to use various saccharine matters in combination, the non-crystallizing component or components then exerting a useful restraining effect on the crystallizing tendencies of the other component or components. If a sufficient proportion of commercial glucose be used, say enough to constitute about 50% of the saccharine constituents, the restraining effect on the tendency of the other saccharine matter to crystallize is so great that a certain quantity of the dry particles of one batch may be allowed to stay in the apparatus and mix with the syrup being evaporated to form the next batch without the crystallization which would otherwise occur if pure cane sugar, or other crystallizable form of saccharine matter, were used alone and exposed to the action of such carried-over dry particles.

I am aware that the ability of sugar to retain and preserve to a greater or less extent the flavor and substance of certain food products and beverages has long been well known, and that the use of sugar in the form of syrups for this purpose has long been common practice, as in the making of jams and preserves, but, so far as known to me, all previous efforts to manufacture a dry form of sugar, either alone or in food preserving combinations, have resulted in the production of the crystalline form of sugar or barley sugar, and these simply will not serve for reasons above given.

One form of apparatus usable for carrying out the process and making the product herein set out is illustrated in the accompanying drawings in which—

Fig. 2 is a vertical section taken on line 2—2 of Fig. 1.

Figure 1:
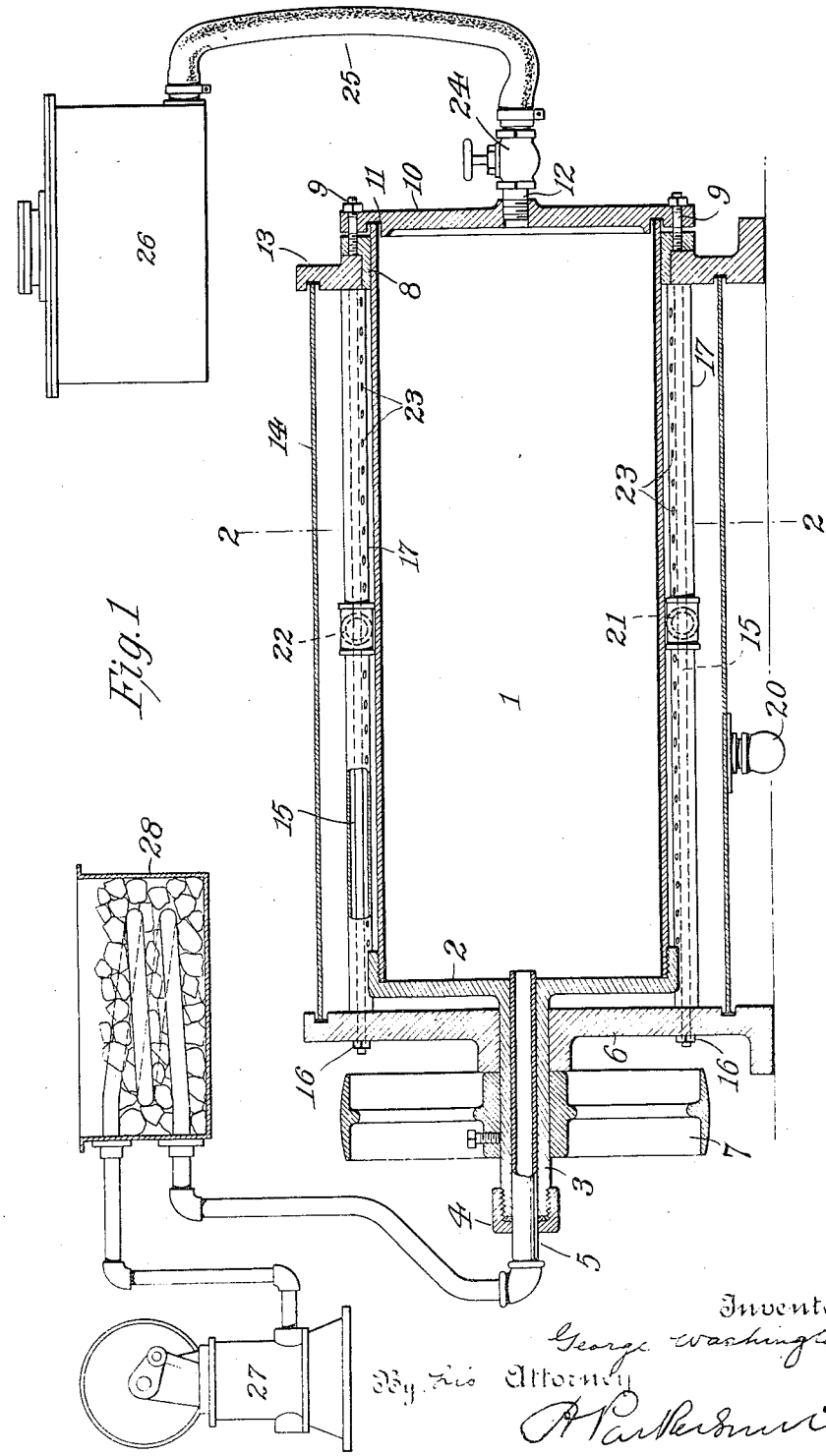
Fig. 1 is a side view of the apparatus, shown partly in section.

Throughout the drawings like reference characters indicate like parts. 1 is a horizontal, hollow cylinder, which may be made of metal with a glass or enameled lining and provided at one end with a permanent cap 2, and at the other with a removable end plate or cover 10, held by bolts 9, 9, to a bearing ring 8, fast on that end of the cylinder. The joint between cylinder end and cover may be made air-tight by a gasket 11. This cylinder or retort 1 is journaled on a horizontal axis, as by trunnion 3 on cap 2 revolving in header 6, and bearing ring 8 revolving in the opposite header 13. Headers 6 and 13 are spaced apart by tubes 17, 17, and held against the ends of said tubes by rods 15, 15, threaded at their ends and provided with external nuts 16, 16. The headers also support a shell 14 surrounding the retort 1, and forming a jacket or casing therefor. One of the pipes 17 is connected to a heating pipe 21 which delivers a fluid heating medium such as steam controlled by a valve 19. Another supplies a cooling medium, such as cold water, delivered through a pipe 22, controlled by a valve 18. These two pipes 17, 17 connected respectively to pipes 21 and 22 have perforations 23 so located that jets of the contained fluids are discharged against the exterior surface of retort 1. The waste water and condensed steam are trapped off through trap 20 at the bottom of the jacket or casing formed by headers 6 and 13 and plates 14.

Retort 1 may be rotated by pulley 7 on the exterior of trunnion 3. This trunnion is centrally bored and receives pipe 5, with which it makes an air-tight joint by means of stuffing box 4. Similarly, cover plate 10 is centrally bored to receive pipe 12 controlled by valve 24. This pipe 24 may conveniently be connected to a hose 25 which leads from any suitable reservoir 26. Pipe 5 extends to a suction pump 27 passing through any suitable cooling device such as a receptacle 28 for cracked ice, in the interior of which said pipe 5 is coiled to give a large radiating surface and serve as a condenser of vapors drawn from the retort 1.

The foregoing apparatus forms a convenient device for concentrating and desiccating any proper solution placed in reservoir 26 into the desired mass of bubble walls with glassy walls hereinbefore described. A partial vacuum being formed in retort 1, by operating pump 27, and valve 24 being opened, a proper quantity of the solution in reservoir 1 is sucked into the retort, and, on closing valve 24, the retort is set in rotation by means of pulley 7. Steam is then admitted through pipe 21, and the steam jets impinging on the revolving retort heat it to the desired temperature to produce the concentration and ultimate desiccation of the contents, the vapors liberated by ebullition of the solution being drawn off by the pump through the condensers. The steam is then shut off, the retort and contents cooled by the jets of water admitted through pipe 22, the vacuum broken and the desiccated contents scraped from the interior walls of the retort after cover 10 has been removed.

As an example of the process followed in producing, according to my invention, a powder from a solution of sugar and lemon juice, I may take 25 pounds of the fresh juice extracted from lemons and thoroughly mix with a perfect solution of 10 pounds of granulated sugar, and, on this being sucked into the retort 1, rotate the same at the rate of about 30 revolutions a minute. The steam supplied through perforations 23 in the pipe 17 connected to pipe 21 is so regulated that the temperature of retort 1 does not rise above 40 degrees centigrade, when the pump 27 is operated at a speed that will maintain a vacuum in the retort of about 1 millimeter absolute pressure under existing conditions. As the solution boils off and concentrates under these conditions, it begins to adhere to the walls of the revolving retort and is thereby ultimately spread over the interior of the retort in an evenly distributed layer which begins to puff up into the mass of bubbles with glass-like walls hereinbefore described. The mass is ultimately, in about 4 hours, desiccated in a layer of such superposed bubbles 3 or 4 inches thick.

The steam is then shut off and cold water admitted through pipe 22, and sprayed on the retort. Then the vacuum is broken and cover 10 removed, the desiccated mass scraped out and crushed to the proper fineness to form the powder of pellicular character which, on being redissolved at any time by addition of the proper quantity of water, will produce lemonade having all the flavor and other characteristics which it would have possessed if made by properly diluting the original fruit juice and sugar solution above described.

Upon repeating the above described operation it is advisable to first admit a small quantity of water to the retort and to revolve the same to make sure that any particles remaining from the preceding batch are completely dissolved, or to make sure that the sugar and fruit juice admitted is an unsaturated solution which will similarly dissolve the left-over particles. Either procedure will prevent such left-over particles from starting the process of crystallization when the concentrating of the second batch begins.

When soluble solid matter, such as coffee extract, is used with the sugar, the soluble extract takes the place of practically an equal amount of sugar so far as aiding in the bubble formation is concerned. In other words, the quality of forming the glassy bubble walls herein described is not a property possessed by sugar alone, but is characteristic of certain other soluble materials. If such a material, such as coffee extract, is used with the sugar the bubbles will form properly even if the insoluble matter present (such as milk solids or chocolate) is more than one third of the weight of the sugar, so long as such insoluble matter is less than thirty-five per cent of the total weight of the sugar, the soluble coffee extract, and the insoluble matter (milk solids) combined.

To state the proposition in another way I may say that so long as the total soluble matter, (saccharine or other soluble materials) constitutes sixty-five per cent or more of the total solids (both soluble and insoluble) the proper bubble formation will occur.

I have further found, as before stated, that in case a given mixture containing enough cane sugar to be fluffy and soluble may prove too sweet, resort may be had to a sugar of less sweetening capacity, such as grape sugar or glucose, which may be used wholly or partially as a substitute without in any way impairing the other qualities of the preparation so long as the total amount of sugars and auxiliary soluble matter bears the proper relation to total amount of the insoluble materials of the mixture.

I have further discovered, as before suggested, that it is sometimes difficult to obtain the residue in the foamlike mass described because when the concentration has proceeded to a certain point the residue suddenly granulates or crystallizes and the resulting dry product will then yield upon solution only a beverage that will be flat and devoid of the volatile and aromatic principles of the flavoring material used. This tendency of this residue to granulate or crystallize is generally due to the incomplete solution of the sugar before evaporation is begun, or is caused by any undissolved residue remaining in the vacuum dryer from a prior drying operation. I have also found that if the sugar in the mixture comprises from 10 per cent to 15 per cent of commercial glucose, the inhibitive properties of the latter will generally be sufficient to prevent any such granulation, even under a moderate occurrence of the above described conditions. This I believe to be due to the action of the dextrine which usually occurs in commercial glucose. Probably other gums than dextrine might have the same beneficial effect in properly regulated quantities.

Various changes evidently could be made in the exact steps of procedure herein described, and in the materials employed, without departing from the substance of my invention so long as the principles of operation and general characteristics herein outlined are retained.

Having described my invention, I claim:

1. As a new article of manufacture, a powder composed of small, thin, readily soluble amorphous pellicles of saccharine matter having glassy walls.

2. The process of forming an amorphous powder of saccharine matter which comprises evaporating a comparatively thin layer of a perfect aqueous solution of such matter and desiccating the solid residue thereof at a sub-atmospheric pressure and at a temperature below that of fusion of the materials, whereby said residue is transformed into a foamlike mass of bubbles, and then crushing the dry walls of such bubbles.

3. The process of forming an amorphous powder of saccharine matter which comprises evaporating a perfect aqueous solution of such matter and desiccating the solid residue thereof at sub-atmospheric pressure and at a temperature below that of fusion of the materials, whereby said residue is transformed into a foamlike mass of bubbles, and then crushing the dry walls of such bubbles.

4. The process of forming an intimate but soluble mixture of saccharine materials having different fusion points which comprises producing a perfect aqueous solution of the materials, and evaporating such solution at sub-atmospheric pressure and at a temperature below the lowest fusion point of any of said materials until the solid constituents thereof are transformed into a foamlike mass of desiccated bubble walls.

GEORGE WASHINGTON.

Witnesses:
W. H. LEONARD,
EDWARD BARRY.